US007014674B2

(12) United States Patent
Ryan et al.

(10) Patent No.: US 7,014,674 B2
(45) **Date of Patent: *Mar. 21, 2006**

(54) BIOLOGICAL SAFETY CABINET

(75) Inventors: Raymond F. Ryan, Wilmington, NC (US); John H. McNally, Oak Island, NC (US)

(73) Assignee: Flow Sciences, Inc., Leland, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/628,768

(22) Filed: Jul. 28, 2003

(65) Prior Publication Data

US 2005/0022487 A1 Feb. 3, 2005

(51) Int. Cl.
*B01D 50/00* (2006.01)

(52) U.S. Cl. .......................... 55/385.2; 55/356; 55/467; 55/496; 55/505; 55/506; 55/508; 55/DIG. 18; 454/187

(58) Field of Classification Search ............... 55/385.2, 55/356–358, 467, 472, 473, 482, 496, 505, 55/506, 508, DIG. 18; 454/187–189, 193
See application file for complete search history.

(56) References Cited

U.S. PATENT DOCUMENTS 3,273,323 A * 9/1966 Whitefield ................. 55/385.2
3,363,539 A 1/1968 Taylor et al.
3,729,905 A 5/1973 Diccianni
3,811,250 A 5/1974 Fowler, Jr.
3,895,570 A 7/1975 Eagleson, Jr.
3,926,597 A 12/1975 Landy
3,944,405 A * 3/1976 VAN Calsteren et al. .... 55/338
4,098,174 A 7/1978 Landy
4,100,847 A 7/1978 Norton
4,249,463 A 2/1981 Hornby
4,548,627 A * 10/1985 Landy ....................... 55/385.2
4,637,301 A 1/1987 Shields
4,832,717 A * 5/1989 Peters ......................... 55/473
4,927,438 A * 5/1990 Mears et al. ............... 55/385.2
5,295,902 A 3/1994 Hock
5,380,244 A 1/1995 Tipton
5,665,128 A 9/1997 Peters et al.
5,711,705 A * 1/1998 Krainiak et al. .............. 454/57
6,010,400 A 1/2000 Krainiak et al.
6,036,737 A 3/2000 Smith et al.
6,368,206 B1 4/2002 Hunter et al.
6,383,241 B1 * 5/2002 Janus et al. ................ 55/385.2
6,508,850 B1 * 1/2003 Kotliar ...................... 55/385.2
6,623,538 B1 * 9/2003 Thakur et al. ............. 55/385.2
6,896,712 B1 * 5/2005 Ryan et al. ................ 55/385.2

* cited by examiner

*Primary Examiner*—Minh-Chau T. Pham
(74) *Attorney, Agent, or Firm*—MacCord Mason PLLC

(57) ABSTRACT

A biological safety cabinet includes a work chamber having a contaminated air discharge opening, a fan enclosure above the work chamber, a conduit extending from the chamber air outlet to the top of the fan enclosure, a first HEPA filter in the top of the fan enclosure, a second HEPA filter between the fan enclosure and the work chamber, and a fan within the fan enclosure to convey air through the conduit from and the first HEPA filter into the fan enclosure, and to discharge air under positive pressure from the fan enclosure through the exhaust port and through the second HEPA filter into the work chamber. Due to the construction of the cabinet, the fan can be repaired or replaced without the need to observe biohazard procedures.

13 Claims, 1 Drawing Sheet

BIOLOGICAL SAFETY CABINET

BACKGROUND OF THE INVENTION

1. Field of the Invention

The present invention relates to laboratory safety enclosures for use in handling biohazard materials, and in particular biological safety cabinets in which the fan is isolated from biohazard contaminated air, without interfering with the flow of uncontaminated air through the work chamber.

2. Description of the Prior Art

Fume hoods and laboratory safety enclosures are safety devices used in research, analytical, teaching, and other laboratories. These containment devices provide enclosed work areas where handling of toxic substances can be performed with minimum risk to users. They are used primarily in pharmaceutical, chemical, biological and toxicological laboratory settings. Biological safety cabinets are particularly adapted to the handling of biologically hazardous materials while providing product and personnel protection. A biological safety cabinet is comprised of a work chamber within which materials are manipulated or worked upon by an operator, a means for introducing uncontaminated air into the chamber, an air exhaust mechanism for removing contaminated air from the chamber, and a HEPA filter for removing hazardous contaminants from the contaminated air before exhausting the air from the cabinet, and/or returning the air to the work chamber.

The work chamber may include a pair of spaced, parallel side walls; rear and upper walls joining the side walls; and a bottom wall or floor that together define the work chamber. The front edges of the side, upper and bottom walls may define an access opening or inlet into the chamber through which the operator manipulates material within the chamber. Exterior air, i.e., air from outside the cabinet, can enter the chamber through this access opening. For example, exhaust ports can be provided in both sidewalls of the cabinet. Air is exhausted from the work chamber through an opening that may be located on the opposite side of the chamber from the access opening or in the bottom of the chamber, preferably front and back, depending on the cabinet design.

Air exhausted from the chamber may be discharged to the atmosphere, i.e., to the exterior of the cabinet, such as into the room where the cabinet is located, or outside the building. Before being discharged, the air is directed through a HEPA filter to remove contaminants. More commonly, a portion of the air is returned to the work chamber after passing through the HEPA filter. Makeup air to replace the portion of the air discharged is then drawn in from the exterior of the cabinet.

Periodic maintenance of the biological cabinet is required. In particular, it is often necessary to repair or replace the fan used to draw contaminated air from the chamber. If there is a risk that the fan has been contaminated with hazardous material, it is necessary to observe hazardous material procedures, which dramatically increases the difficulty and time required for fan repair or replacement. Therefore, a biological safety cabinet design that avoids fan contamination without adversely affecting the desired laminar airflow through the work chamber would be of considerable value.

Accomplishment of these objectives while still providing a compact cabinet design would be particularly useful.

SUMMARY OF THE INVENTION

The present invention relates to biological safety cabinets used in the handling of biohazardous materials, and in particular to biological safety cabinets in which the fan is not exposed to hazardous material, thereby facilitating fan repair or replacement.

Basically, the cabinet of the invention is comprised of a work chamber with a contaminated air opening and a return air opening, a HEPA filter to filter contaminated air discharged from the contaminated air opening, and a fan to convey air from the contaminated air opening to the return air opening.

The work chamber has top, bottom, back, front and side walls. The front wall may be a partial wall or include a moveable section, so that an access opening is provided in the front wall. The access opening may be defined by the front edges of the top, bottom and side walls. An airfoil may be positioned along one or more of the front edges to direct the flow of air into the chamber. The chamber also includes one or more contaminated air discharge openings in the bottom and/or lower part of the rear wall, so that contaminated air can be discharged from the chamber.

Air is discharged into a conduit that extends from the discharge openings to the return air opening so that air can be recycled back to the chamber. The return air opening is preferably in the top wall of the work chamber, and may extend entirely across the top wall, so that the opening effectively becomes the top wall, or only partially across the top wall. The conduit includes an exhaust port through which a part of the air, e.g., 30% of the air volume, can be exhausted from the cabinet. The exhaust port may optionally be covered with a filter.

A first HEPA filter is positioned downstream of the chamber discharge opening to remove biohazardous materials as the air is discharged from the chamber. In addition, a second HEPA filter may be positioned across the top wall opening. This latter HEPA filter is precautionary and serves to prevent contaminated air from entering the air conduit and contaminating the fan in the event that there is a loss of airflow.

To effectively draw air from the chamber, and then exhaust a portion of the air from the cabinet through the exhaust port while returning the rest of the air to the chamber, it has been found that only a single fan should be used to create the necessary airflow, and that the single fan must be positioned between the first HEPA filter and the exhaust opening. When in this position, the fan creates a vacuum within the chamber and on the discharge side of the first HEPA filter and a positive pressure at the exhaust opening. The presence of a second fan, such as illustrated in U.S. Pat. No. 3,944,405 to van Calsteren et al, renders a cabinet of the present configuration unworkable, since the pressure differential required to exhaust air from the exhaust port is eliminated. Thus, the airflow means of the present invention consists of a single fan positioned between the HEPA filtered discharge opening of the chamber and the cabinet exhaust port.

Preferably, the components of the cabinet are arranged in a manner that will shield the fan from biohazardous materials, while at the same time providing for laminar air flow within the cabinet. At the same time, the cabinet should be as compact as possible. In the preferred embodiment, these objectives are accomplished by providing a work chamber having front, back, top, bottom and side walls, with the cabinet having contaminated air discharge openings adjacent its bottom wall; a fan enclosure above the top wall of the work chamber; a first HEPA filter positioned horizontally above the fan enclosure; a second HEPA filter positioned between the work chamber and the fan enclosure; and a conduit extending from the bottom of the work chamber to the top of the fan enclosure.

A fan is positioned in the fan enclosure to draw air from the work chamber discharge openings through the conduit, and then down through to HEPA filters and the fan enclosure to return a portion of the filtered air to the work chamber. Return air entering the work chamber flows in a laminar fashion from the work chamber side of the second HEPA filter downwardly to the work chamber discharge openings. The fan enclosure includes an exhaust port downstream of the fan. The fan, coupled with the pressure drop from the second HEPA filter, creates a positive air pressure adjacent the exhaust port, so that a portion of the air is discharged from the cabinet through the exhaust port. The cabinet also includes a makeup air inlet adjacent to the bottom of the work chamber. Air to replace the exhausted air is drawn into the conduit through the makeup air inlet. In some embodiments, the work chamber access opening also serves as the makeup air inlet.

DETAILED DESCRIPTION OF THE PREFERRED EMBODIMENT

Figure 1:
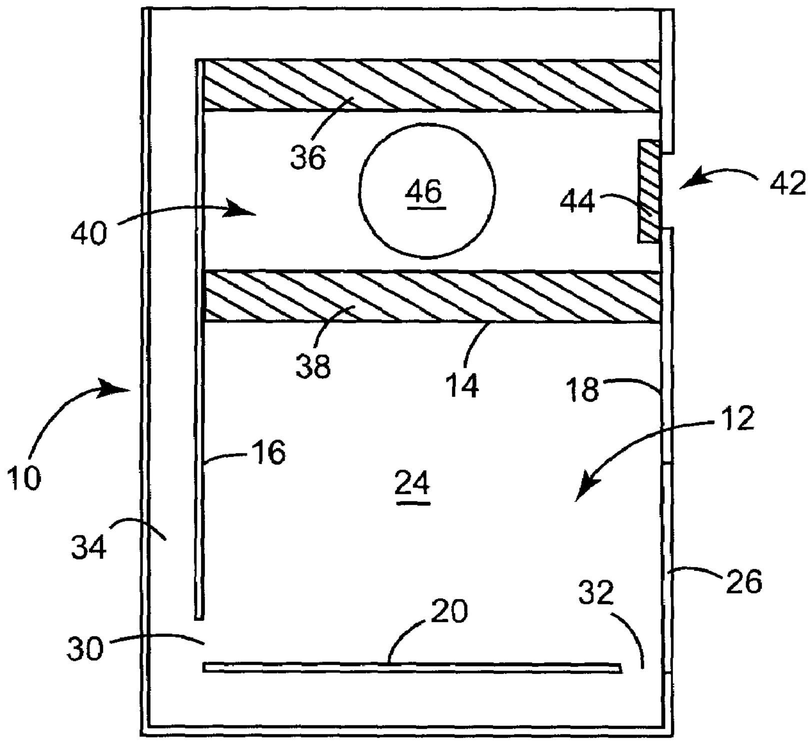
FIG. 1 is a sectional side view of a preferred embodiment of the invention.
Figure 2:
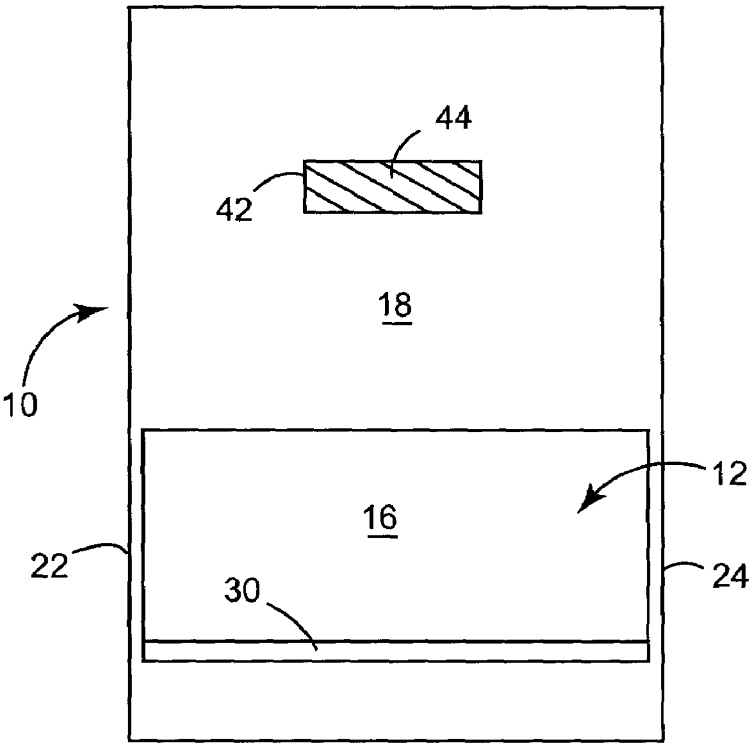
FIG. 2 is a front view of the preferred embodiment.

As illustrated in FIGS. 1 and 2, cabinet, generally 10, is comprised of a chamber 12 defined by top wall 14, back wall 16, front wall 18, bottom wall 20 and side walls 22 and 24. Front wall 18 includes an access opening 26 through which material can be inserted into and removed from chamber 12. Opening 26 also serves as a makeup air inlet. Discharge openings 30 and 32 are located at the lower edge of back wall 16 and the front edge of bottom wall 20, respectively.

Air conduit 34 extends beneath bottom wall 20, behind back wall 16 and is spaced above top wall 14. Conduit 34 includes a discharge opening covered by a first HEPA filter 36, which is horizontally oriented in the preferred embodiment. A second HEPA filter 38 extends across top wall 14. Filter 38 is spaced beneath filter 36, with the filters being parallel to each other in the preferred embodiment. Filters 36 and 38, and the upper sections of walls 16, 18, 22 and 24 define a fan enclosure 40 positioned above chamber 12. Enclosure 40 includes an exhaust port 42, so that air can be exhausted from enclosure 40 to the exterior of cabinet 10. As illustrated, port 42 extends through front wall 18. It will be understood, however, that port 42 can be positioned in one of the other walls forming enclosure 40. If desired, a filter 44 can be positioned over port 42.

Upon activation of fan 46 within enclosure 40, air is drawn from access opening 26 and discharge openings 30 and 32 through conduit 34 and downward through first HEPA filter 36 into fan enclosure 40. The presence of second HEPA filter 38 creates a positive pressure within enclosure 40. As a result, a part of the air filtered by first HEPA filter 36 is exhausted to the exterior of cabinet 10 through exhaust port 42. The remainder of the air flows through second HEPA filter 38 into chamber 12, and then flows in a laminar manner to discharge openings 30 and 32.

The above cabinet provides several advantages in comparison to prior art cabinets. First, due to the absence of a fan downstream of the exhaust opening, a positive pressure is created that discharges a portion of the air from the exhaust port. Second, since the fan is placed downstream of the first HEPA filter, a biohazard concern is not present if repair or replacement of the fan is required. Finally, the orientation of the two HEPA filters in the spaced, horizontal, parallel manner described and illustrated to form the fan enclosure above the work chamber provides a compact cabinet, while still enabling effective air filtration and laminar flow through the work chamber.

Certain modifications and improvements will occur to those skilled in the art upon a reading of the foregoing description. For example, while not as preferred, the first HEPA filter and fan can be positioned at other locations and orientations in the conduit, so long as they are upstream of the exhaust opening. It should be understood that all such modifications and improvements have been deleted herein for the sake of conciseness and readability but are properly within the scope of the following claims.

What is claimed is:

1. A biological safety cabinet having a makeup air inlet comprising:

a) a work chamber having an air inlet and a contaminated air discharge opening;

b) a fan enclosure having an exhaust port;

c) a conduit extending from said contaminated air discharge opening to said fan enclosure, said conduit including a makeup air inlet;

d) a first HEPA filter downstream of said contaminated air outlet and said air inlet and upstream of said fan enclosure; and e) a fan within said fan enclosure to draw air through said conduit from said contaminated air outlet and said makeup air inlet through said first HEPA filter into said fan enclosure, said fan being the only means for conveying air through said conduit and said first HEPA filter and into said fan enclosure, whereby a positive pressure is created downstream of said fan so that a portion of the air is exhausted through the exhaust port and a portion of the air is returned to the work chamber, said fan being isolated from contaminated air by said first HEPA filter.

2. The cabinet of claim 1, wherein said fan enclosure has a front wall and said exhaust port extends from the front wall of said fan enclosure.

3. The cabinet of claim 1, wherein said chamber includes a bottom wall having a front edge and a rear edge, said chamber having discharge openings adjacent the front and rear edges of said bottom wall.

4. The cabinet of claim 1, further including a second HEPA filter between said fan enclosure and said work chamber.

5. The cabinet of claim 1, further including a filter covering said exhaust port.

6. The cabinet of claim 1, wherein said fan enclosure is above said work chamber.

7. The cabinet of claim 1, wherein said fan enclosure includes a top wall, said first HEPA filter extending across said top wall.

8. A biological safety cabinet comprising:

a) a work chamber having an air inlet and a contaminated air discharge opening;

b) a fan enclosure above said work chamber, said enclosure having an exhaust port, a top and a bottom;

c) a conduit extending from said discharge opening to said fan enclosure said conduit including a makeup air inlet;

d) a first HEPA filter downstream of said contaminated air outlet and said air inlet and upstream of said fan enclosure;

e) a second HEPA filter between said fan enclosure and said work chamber; and f) a fan within said fan enclosure to draw air through said conduit through said first HEPA filter and into said fan enclosure, said fan being the only means for conveying air through said conduit and said first HEPA filter and into said fan enclosure and to discharge air under positive pressure from said fan enclosure through said exhaust port and through said second HEPA filter into said work chamber, said fan being isolated from contaminated air by said HEPA filters.

9. The cabinet of claim 8, wherein said conduit extends to the top of said fan enclosure.

10. The cabinet of claim 8, wherein said HEPA filter extends across the top of said fan enclosure.

11. The cabinet of claim 8, wherein said first and second HEPA filters are horizontal and parallel to each other.

12. The cabinet of claim 8, wherein said fan enclosure has a front, said exhaust port being in the front of said enclosure.

13. The cabinet of claim 8, wherein said exhaust port is filtered.

* * * * *